United States Patent
Yang (10) Patent No.: US 8,727,090 B2
(45) Date of Patent: May 20, 2014

(54) CENTRIFUGAL FORCE COMBINED WITH SLIDING DAMPING TYPE TORQUE ACTUATED CLUTCH

(76) Inventor: Tai-Her Yang, Dzan-Hwa (TW)

( * ) Notice: Subject to any disclaimer, the term of this patent is extended or adjusted under 35 U.S.C. 154(b) by 350 days.

(21) Appl. No.: 12/805,281

(22) Filed: Jul. 22, 2010

(65) Prior Publication Data

US 2012/0018269 A1    Jan. 26, 2012

(51) Int. Cl.
*F16D 43/22*    (2006.01)

(52) U.S. Cl.
USPC ....... 192/35; 192/54.52; 192/55.1; 192/103 R (58) Field of Classification Search
USPC .......................................... 192/48.4
See application file for complete search history.

(56) References Cited

U.S. PATENT DOCUMENTS

| | | | | |
|---|---|---|---|---|
| 1,925,897 A | * | 9/1933 | Fawick | 192/35 |
| 2,663,397 A | * | 12/1953 | Scott | 192/48.3 |
| 3,224,541 A | * | 12/1965 | Yamamoto | 192/105 CD |
| 3,300,002 A | * | 1/1967 | Roper | 192/35 |
| 3,656,597 A | * | 4/1972 | Gruchmann et al. | 192/35 |
| 3,810,533 A | * | 5/1974 | Densow | 192/105 CD |
| 4,412,605 A | * | 11/1983 | Deem et al. | 192/36 |
| 4,538,713 A | * | 9/1985 | Wasada | 192/54.51 |
| 4,889,215 A | * | 12/1989 | Ohkanda | 192/48.1 |

* cited by examiner

*Primary Examiner* — Rodney Bonck
(74) *Attorney, Agent, or Firm* — Bacon & Thomas, PLLC (57) ABSTRACT

The present invention relates to a centrifugal force combined with sliding damping type clutch actuated by torque capable of controlling a clutch device to perform operations of coupling or disengaging with the driving torque, characterized in that a relay transmission structure assembly (104) is installed between a rotary prime motive end (101) and an output-end clutch structure (1052) is installed at an output end (102), the relay transmission structure assembly (104) is installed with a relay coupling structure (204) having an active side of relay coupling structure and a passive side of relay coupling structure, a limit-torque sliding damping device (106) is installed between the relay transmission structure assembly (104) and the static housing (107).

14 Claims, 5 Drawing Sheets

CENTRIFUGAL FORCE COMBINED WITH SLIDING DAMPING TYPE TORQUE ACTUATED CLUTCH

BACKGROUND OF THE INVENTION (a) Field of the Invention

A centrifugal force combined with sliding damping type clutch actuated by torque is disclosed, characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, the prime motive end (101) is provided with a limiting structure (115) for limiting relative positions of the relay transmission structure assembly (104) and the prime motive end (101);

a limit-torque sliding damping device (106) and a centrifugal force combining type centrifugal clutch (1006) are installed between the relay transmission structure assembly (104) and the static housing (107) and is rotated in a first rotational direction at the prime motive end (101) to drive the active side of relay coupling structure of the relay coupling structure (204) installed in the relay transmission structure assembly (104) to be in an idle rotating state before reaching a pre-set rotational speed, and at the time reaching or exceeding the pre-set rotational speed the centrifugal force combining type centrifugal clutch (1006) installed between the relay transmission structure assembly (104) and the static housing (107) turns to be in an engaged state so as to be combined with the limit-torque sliding damping device (106) for generating a sliding damping effect, such that the passive side of relay output coupling structure is driven by the active side of relay coupling structure to move, and the relay transmission structure assembly (104) and a relay output clutch structure (1051) installed in the relay transmission structure assembly (104) is driven to perform closing/opening operations with the output-end clutch structure (1052) installed at the output end (102) so as to transmit rotary kinetic energy, and to force the recovering actuation spring (120) provided between the relay output clutch structure (1051) and the output-end clutch structure (1052) to be tightened;

when the rotational driving torque at the prime motive end (101) is no longer provided, the relay transmission structure assembly (104) is returned and the relay output clutch structure (1051) and the output-end clutch structure (1052) are disengaged through actions of the recovering actuation spring (120), thereby the output end (102) is released;

moreover, when the rotational speed in which the centrifugal force combining type centrifugal clutch (1006) driven at the prime motive end (101) is greater or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the recovering actuation spring (120) to be returned, thereby the relay output clutch structure (1051) and the output-end clutch structure (1052) are disengaged.

(b) Description of the Prior Art

A conventional single-way clutch (S.W.C.) or an over running clutch (O.R.C) has following transmission features:

when an active side is driven in one rotational direction, e.g. the clockwise direction, a passive side is able to be linked; on the other hand, when the passive side is driven in the counterclockwise direction, the active side is able to be linked;

when the active side is driven in the counterclockwise direction, the passive side is not able to be linked; when the passive side is driven in the clockwise direction, the active side is not able to be linked, the abovementioned are its transmission features;

when the active side is desired to be driven in one of the directions, e.g. the clockwise direction, the passive side is able to be linked for rotational outputting, and when the passive side is driven in the counterclockwise direction, the active side is not able to be linked, which is not the function that the conventional single-way transmission device can provide.

SUMMARY OF THE INVENTION

A centrifugal force combined with sliding damping type clutch actuated by torque is disclosed, characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, the prime motive end (101) is provided with a limiting structure (115) for limiting relative positions of the relay transmission structure assembly (104) and the prime motive end (101);

a limit-torque sliding damping device (106) and a centrifugal force combining type centrifugal clutch (1006) are installed between the relay transmission structure assembly (104) and the static housing (107) and is rotated in a first rotational direction at the prime motive end (101) to drive the active side of relay coupling structure of the relay coupling structure (204) installed in the relay transmission structure assembly (104) to be in an idle rotating state before reaching a pre-set rotational speed, and at the time reaching or exceeding the pre-set rotational speed the centrifugal force combining type centrifugal clutch (1006) installed between the relay transmission structure assembly (104) and the static housing (107) turns to be in an engaged state so as to be combined with the limit-torque sliding damping device (106) for generating a sliding damping effect, such that the passive side of relay output coupling structure is driven by the active side of relay coupling structure to move, and the relay transmission structure assembly (104) and a relay output clutch structure (1051) installed in the relay transmission structure assembly (104) is driven to perform closing/opening operations with the output-end clutch structure (1052) installed at the output end (102) so as to transmit rotary kinetic energy, and to force the recovering actuation spring (120) provided between the relay output clutch structure (1051) and the output-end clutch structure (1052) to be tightened;

when the rotational driving torque at the prime motive end (101) is no longer provided, the relay transmission structure assembly (104) is returned and the relay output clutch structure (1051) and the output-end clutch structure (1052) are disengaged through actions of the recovering actuation spring (120), thereby the output end (102) is released;

moreover, when the rotational speed in which the centrifugal force combining type centrifugal clutch (1006) driven at the prime motive end (101) is greater or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the recovering actuation spring (120) to re returned, thereby the relay output clutch structure (1051) and the output-end clutch structure (1052) are disengaged.

DESCRIPTION OF MAIN COMPONENT SYMBOLS

101: prime motive end
102: output end
104: relay transmission structure assembly
106: limit-torque sliding damping device
107: static housing
115: limiting structure
120: recovering actuation spring
204: relay coupling structure
1006: centrifugal force combining type centrifugal clutch
1041: screw rod structure
1042: screw nut structure
1043: coil-shaped spring capable of rotating for axial actuation
1051: relay output clutch structure
1052: output-end clutch structure
1060: axial compelling over running clutch
1061: active side of axial compelling over running clutch
1062: passive side of axial compelling over running clutch
1063: middle rolling member
1071: active side of axial relay clutch
1072: axial clutch transmission block
1073: axial clutch transmission block recovering spring
1074: axial relay clutch transmission board
1075: middle rolling member
1076: passive side of axial relay clutch
1077: axial clutch structure
1079: transmission end
1081: active side of radial relay clutch
1082: radial clutch transmission block
1083: radial clutch transmission block recovering spring
1084: radial relay clutch transmission board
1085: middle rolling member
1086: passive side of radial relay clutch
1087: radial clutch structure
1089: transmission end

DETAILED DESCRIPTION OF THE PREFERRED EMBODIMENTS

The present invention relates to a centrifugal force combined with sliding damping type clutch actuated by torque is disclosed, characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, the prime motive end (101) is provided with a limiting structure (115) for limiting relative positions of the relay transmission structure assembly (104) and the prime motive end (101);

a limit-torque sliding damping device (106) and a centrifugal force combining type centrifugal clutch (1006) are installed between the relay transmission structure assembly (104) and the static housing (107) and is rotated in a first rotational direction at the prime motive end (101) to drive the active side of relay coupling structure of the relay coupling structure (204) installed in the relay transmission structure assembly (104) to be in an idle rotating state before reaching a pre-set rotational speed, and at the time reaching or exceeding the pre-set rotational speed the centrifugal force combining type centrifugal clutch (1006) installed between the relay transmission structure assembly (104) and the static housing (107) turns to be in an engaged state so as to be combined with the limit-torque sliding damping device (106) for generating a sliding damping effect, such that the passive side of relay output coupling structure is driven by the active side of relay coupling structure to move, and the relay transmission structure assembly (104) and a relay output clutch structure (1051) installed in the relay transmission structure assembly (104) is driven to perform closing/opening operations with the output-end clutch structure (1052) installed at the output end (102) so as to transmit rotary kinetic energy, and to force the recovering actuation spring (120) provided between the relay output clutch structure (1051) and the output-end clutch structure (1052) to be tightened;

when the rotational driving torque at the prime motive end (101) is no longer provided, the relay transmission structure assembly (104) is returned and the relay output clutch structure (1051) and the output-end clutch structure (1052) are disengaged through actions of the recovering actuation spring (120), thereby the output end (102) is released;

moreover, when the rotational speed in which the centrifugal force combining type centrifugal clutch (1006) driven at the prime motive end (101) is greater or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the recovering actuation spring (120) to be returned, thereby the relay output clutch structure (1051) and the output-end clutch structure (1052) are disengaged.

Figure 1:
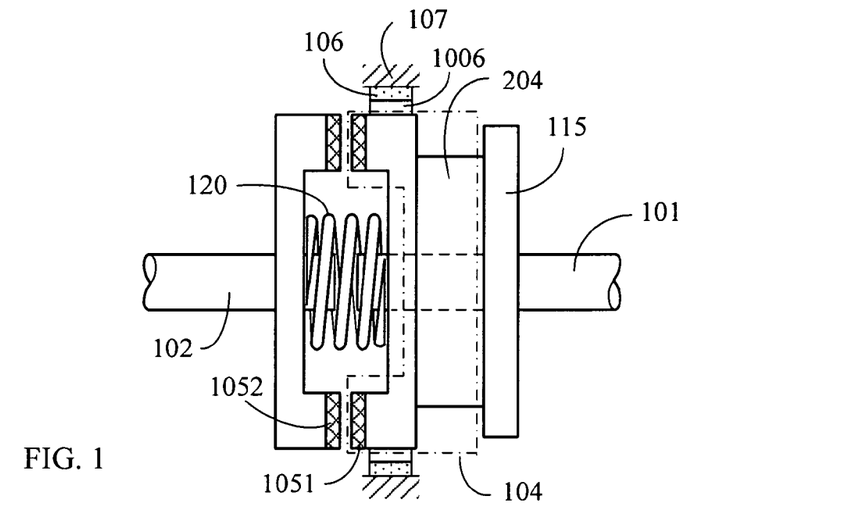
FIG. 1 is a schematic view of the structural theory of the centrifugal force combined with sliding damping type clutch actuated by torque of the present invention.
Figure 2:
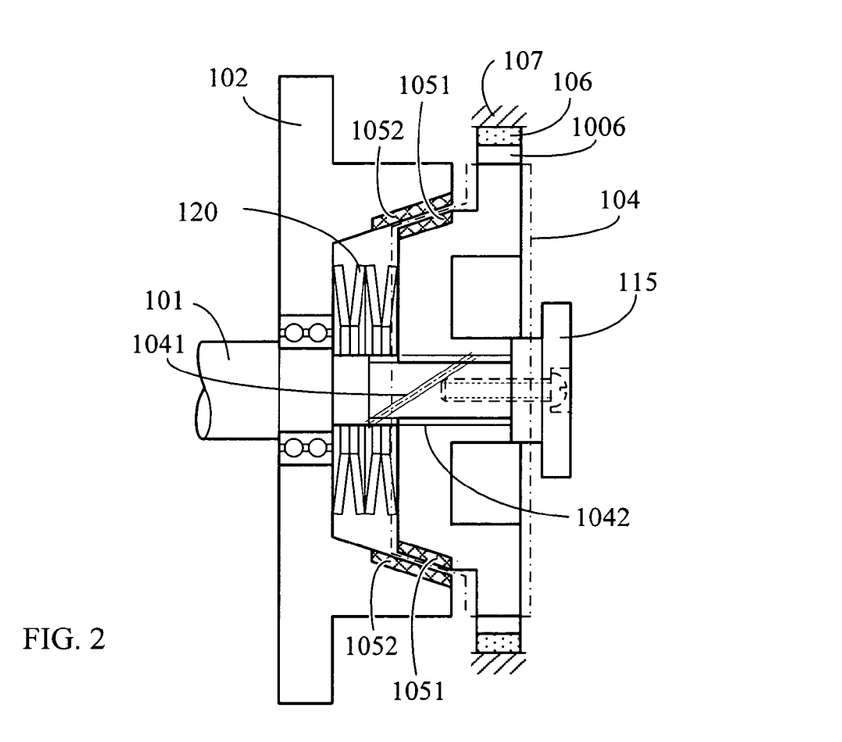
FIG. 2 is a schematic structural view of one embodiment illustrating that the relay coupling structure installed in the relay transmission structure assembly (104) is composed by the screw rod structure (1041) having axial actuation screw angle and the screw nut structure (1042) having axial actuation screw angle.

FIG. 1 is a schematic view of the structural theory of the present invention;

As shown in FIG. 1, it mainly consists of:
- a prime motive end (101): composed by a rotational mechanism for inputting rotary kinetic energy; the prime motive end (101) is served to drive an active side of relay coupling structure of a relay coupling structure (204) installed in a relay transmission structure assembly (104), the prime motive end (101) is installed with a limiting structure (115) for limiting relative positions of the relay transmission structure assembly (104) and the prime motive end (101);
- an output end (102): composed by a rotational mechanism for outputting rotary kinetic energy; the output end (102) is connected to an output-end clutch structure (1052), and is controlled by the output-end clutch structure (1052);
- a relay transmission structure assembly (104): the relay transmission structure assembly (104) is installed between the prime motive end (101) and the output end (102), and is capable of performing rotational driving and axial movements, the relay transmission structure assembly (104) is provided with a relay coupling structure (204) driven by the prime motive end (101), the relay coupling structure (204) has an active side of relay coupling structure and a passive side of relay coupling structure coaxially coupled and interacted with the active side, a limit-torque sliding damping device (106) and a centrifugal force combining type centrifugal clutch (1006) are installed between the mentioned transmission structure assembly (104) and the static housing (107), when the active side of the relay coupling structure is driven by the prime motive end (101) to be in an idle rotating state before reaching a pre-set rotational speed, and at the time reaching or exceeding the pre-set rotational speed the centrifugal force combining type centrifugal clutch (1006) installed between the relay transmission structure assembly (104) and the static housing (107) turns to be in an engaged state so as to be combined with the limit-torque sliding damping device (106) for generating a damping effect, thereby applying the rotational drive torque onto the passive side of relay coupling structure to move the passive side of relay coupling structure, and further to cause the relay transmission structure assembly (104) generating a relative movement, so as to drive the relay output clutch structure (1051) installed in the relay transmission structure assembly (104) to perform closing/opening operations with an output-end clutch structure (1052) for transmitting rotary kinetic energy, and forcing a recovering actuation spring (120) to be tightened;

when the rotational driving torque from the prime motive end (101) to the output end (102) is no longer provided, the relay output clutch structure (1051) and the output-end clutch structure (1052) are disengaged and the passive side of relay coupling structure is returned through a releasing recovering effect provided by the recovering actuation spring (120), thereby terminating the transmission of the rotary kinetic energy;

moreover, when the rotational speed in which the centrifugal force combining type centrifugal clutch (1006) driven at the prime motive end (101) is greater or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the recovering actuation spring (120) to be returned, thereby allowing the relay output clutch structure (1051) and the output-end clutch structure (1052) to be disengaged;
- a limit-torque sliding damping device (106): composed by a mechanism device having limit-torque sliding damping effect with a restraining function while relative rotational movements are generated between the relay transmission structure assembly (104) and the static housing (107); and is installed between the centrifugal force combining type centrifugal clutch (1006) and the static housing (107), so through actions of the limit-torque sliding damping device (106), relative movements are generated between the active side of relay coupling structure and the passive side of relay coupling structure combined in the relay transmission structure assembly (104) when the active side of relay coupling structure is rotationally driven by the prime motive end (101);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force combining type centrifugal clutch (1006): configured by a centrifugal clutch structure device having the function of cutoff at static and low-speed, and installed between the relay transmission structure assembly (104) and the limit-torque sliding damping device (106), and when the active side of relay coupling structure is rotationally driven by the prime motive end (101) to reach a pre-set rotational speed, the centrifugal clutch (1006) is in an engaged state, so as to combine the relay transmission structure assembly (104) and the limit-torque sliding damping device (106) for generating the limit-torque sliding damping between the relay transmission structure assembly (104) and the static housing (107), thereby a relative movement is generated between the active side of relay coupling structure and the passive side of relay coupling structure combined in the relay transmission structure assembly (104);
- a static housing (107): configured by a static housing structure for accommodating the centrifugal force combined with sliding damping type torque-actuated clutch;
- a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and is disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the active side of relay coupling structure is driven by the prime motive end (101), the relay output clutch structure (1051) and the relay transmission structure assembly (104) are driven by the active side of relay coupling structure of the relay coupling structure (204), for performing closing/opening operations with the output-end clutch structure (1052) so as to transmit rotary kinetic energy, when the driving force from the prime motive end (101) to the output end (102) is no longer provided, the relay output clutch structure (1051) and the output-end clutch structure (1052) are disengaged through the releasing elastic force of the recovering actuation spring (120), thereby terminating the transmission of the rotary kinetic energy;

an output-end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the centrifugal force combined with sliding damping type torque-actuated clutch of the present invention, the relay coupling structure (204) installed in the relay transmission structure assembly (104) can be further composed by a screw rod structure (1041) and a screw nut structure (1042);

FIG. 2 is a schematic structural view of one embodiment illustrating that the relay coupling structure installed in the relay transmission structure assembly (104) is composed by the screw rod structure (1041) having axial actuation screw angle and the screw nut structure (1042) having axial actuation screw angle.

Figure 3:
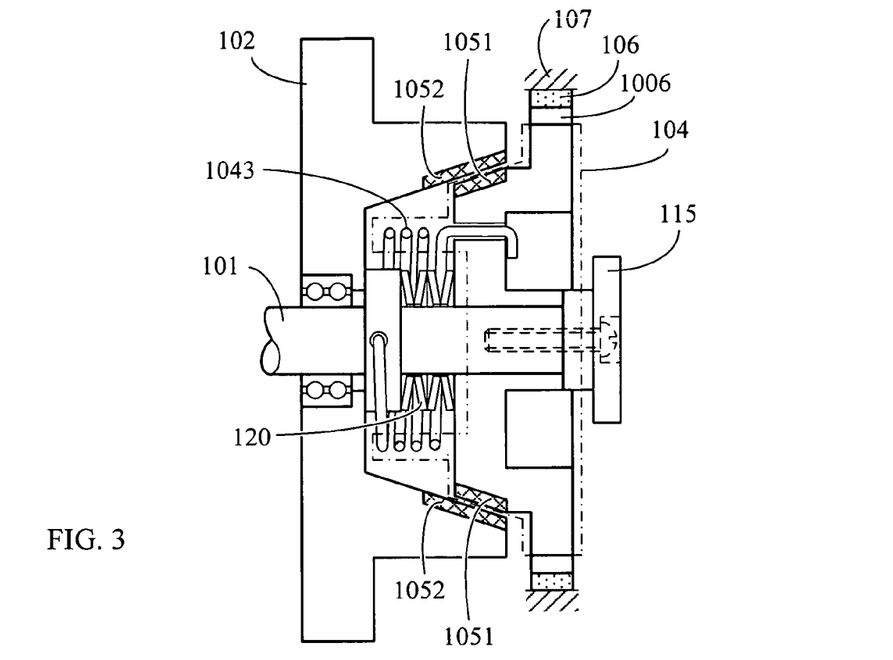
FIG. 3 is a schematic structural view of one embodiment illustrating that the relay coupling structure installed in the relay transmission structure assembly (104) is composed by the coil-shaped spring capable of rotating for axial actuation (1043).

As shown in FIG. 2, it mainly consists of:

a prime motive end (101): composed by a rotational mechanism for inputting rotary kinetic energy; the prime motive end (101) is a screw rod structure (1041) constituting the function of active end of relay coupling structure, for driving the relay transmission structure assembly (104); the prime motive end (101) is installed with a limiting structure (115) for limiting relative positions of the relay transmission structure assembly (104) and the prime motive end (101);

an output end (102): composed by a rotational mechanism for outputting the rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), and is capable of performing rotational driving and axial movements, the relay transmission structure assembly (104) is installed with a relay coupling structure driven by the prime motive end (101), the relay coupling structure has the function of the active side of relay coupling structure composed by the screw rod structure (1041) and the function of the passive side of relay coupling structure composed by the screw nut structure (1042), the screw rod structure (1041) and the screw nut structure (1042) are coaxially coupled and interacted, the mentioned passive side of relay coupling structure composed by the screw nut structure (1042) is connected to the relay transmission structure assembly (104), a limit-torque sliding damping device (106) and a centrifugal force combining type centrifugal clutch (1006) are installed between the relay transmission structure assembly (104) and the static housing (107), when the screw rod structure (1041) is driven by the prime motive end (101) to be in an idle rotating state before reaching a set rotational speed, and at the time reaching or exceeding the pre-set rotational speed the centrifugal force combining type centrifugal clutch (1006) installed between the relay transmission structure assembly (104) and the static housing (107) turns to be in an engaged state so as to be combined with the limit-torque sliding damping device (106) for generating a damping effect, thereby applying the rotational drive torque onto the screw nut structure (1042) to move, and further to cause the relay transmission structure assembly (104) connected with the screw nut structure (1042) generating a relative axial movement for driving the relay output clutch structure (1051) installed in the relay transmission structure assembly (104) to perform closing/opening operations with the output-end clutch structure (1052) for transmitting rotary kinetic energy, and forcing the recovering actuation spring (120) to be tightened;

when the rotational driving torque from the prime motive end (101) to the output end (102) is no longer provided, the relay output clutch structure (1051) and the output-end clutch structure (1052) are disengaged and the screw nut structure (1042) is returned through the releasing recovering effect provided by the recovering actuation spring (120), thereby terminating the transmission of the rotary kinetic energy;

moreover, when the rotational speed in which the centrifugal force combining type centrifugal clutch (1006) driven at the prime motive end (101) is greater or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the recovering actuation spring (120) to be returned, thereby allowing the relay output clutch structure (1051) and the output-end clutch structure (1052) to be disengaged;

a limit-torque sliding damping device (106): composed by a mechanism device having limit-torque sliding damping effect with a restraining function while relative rotational movements are generated between the relay transmission structure assembly (104) and the static housing (107); and is installed between the centrifugal force combining type centrifugal clutch (1006) and the static housing (107), so when the screw rod structure (1041) is rotationally driven by the prime motive end (101), through actions of the limit-torque sliding damping device (106), relative movements are generated between the screw rod structure (1041) and the screw nut structure (1042) combined in the relay transmission structure assembly (104) during the screw rod structure (1041) performing rotational driving to the screw nut structure (1042);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force combining type centrifugal clutch (1006): configured by a centrifugal clutch structure device having the function of cutoff at static and low-speed, and installed between the relay transmission structure assembly (104) and the limit-torque sliding damping device (106), and when the active side of relay coupling structure is rotationally driven by the prime motive end (101) to reach a pre-set rotational speed, the centrifugal clutch (1006) is in an engaged state, so as to combine the relay transmission structure assembly (104) and the limit-torque sliding damping device (106) for generating the limit-torque sliding damping between the relay transmission structure assembly (104) and the static housing (107), thereby a relative movement is generated between the active side of relay coupling structure and the passive side of relay coupling structure combined in the relay transmission structure assembly (104);

a static housing (107): configured by a static housing structure for accommodating the centrifugal force combined with sliding damping type torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and is disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the screw rod structure (1041) is driven by the prime motive end (101), the relay output clutch structure (1051) and the relay transmission structure assembly (104) are driven by the screw rod structure (1041) of the relay coupling structure, for performing closing/opening operations with the output-end clutch structure (1052) so as to transmit rotary kinetic energy and to force the recovering actuation spring (120) being tightened; when the rotational driving torque from the prime motive end (101) to the output end (102) is no longer provided, the relay output clutch structure (1051) and the output-end clutch structure (1052) are disengaged through the releasing elastic force of the recovering actuation spring (120), thereby terminating the transmission of the rotary kinetic energy;

an out-put end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the centrifugal force combined with sliding damping type torque-actuated clutch of the present invention, the relay coupling structure installed in the relay transmission structure assembly (104) can be further composed by a coil-shaped spring capable of rotating for axial actuation (1043);

FIG. 3 is a schematic structural view of one embodiment illustrating that the relay coupling structure installed in the relay transmission structure assembly (104) is composed by the coil-shaped spring capable of rotating for axial actuation (1043).

Figure 4:
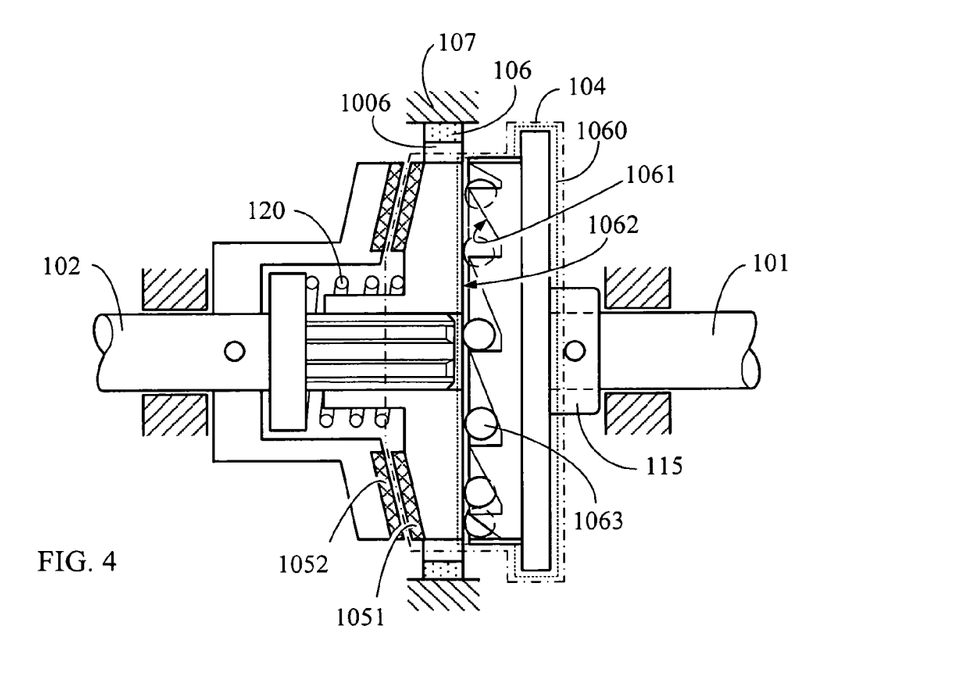
FIG. 4 is a schematic structural view of one embodiment illustrating that the relay coupling structure installed in the relay transmission structure assembly (104) is composed by the axial compelling over running clutch.

As shown in FIG. 3, it main consists of:

a prime motive end (101): composed by a rotational mechanism for inputting rotary kinetic energy; the prime motive end (101) is a coil-shaped spring capable of rotating for axial actuation (1043) for driving the relay transmission structure assembly (104), the prime motive end (101) is installed with a limiting structure (115) for limiting relative positions of the relay transmission structure assembly (104) and the prime motive end (101);

an output end (102): composed by a rotational mechanism for outputting rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), and is capable of performing rotational driving and axial movements, the relay transmission structure assembly (104) is installed with a coil-shaped spring capable of rotating for axial actuation (1043) serving to provide the relay coupling structure function and is coaxially shaft-installed between the relay transmission structure assembly (104) and the prime motive end (101), one end of the coil-shaped spring capable of rotating for axial actuation (1043) is fastened at the prime motive end (101) for providing the function of the active side of relay coupling structure, the other end of the coil-shaped spring capable of rotating for axial actuation (1043) is installed in the relay transmission structure assembly (104) for providing the function of the passive side of relay coupling structure, a limit-torque sliding damping device (106) and a centrifugal force combining type centrifugal clutch (1006) are installed between the relay transmission structure assembly (104) and the static housing (107); when the coil-shaped spring capable of rotating for axial actuation (1043) and the relay transmission structure assembly (104) are driven by the prime motive end (101) to be in an idle rotating state before reaching a set rotational speed, and at the time reaching or exceeding the pre-set rotational speed a damping effect is generated through the centrifugal force combining type centrifugal clutch (1006) and the limit-torque sliding damping device (106) installed between the relay transmission structure assembly (104) and the static housing (107), so the coil-shaped spring capable of rotating for axial actuation (1043) is rotated and tightened to generate an axial actuation force, and causes the relay transmission structure assembly (104) to generate a relative axial movement, such that the relay output clutch structure (1051) installed in the relay transmission structure assembly (104) is driven to perform closing/opening operations with the output-end clutch structure (1052) so as to transmit rotary kinetic energy, and to force the recovering actuation spring (120) to be tightened;

when the rotational driving torque from the prime motive end (101) to the output end (102) is no longer provided, through the releasing recovering force of the recovering actuation spring (120) the relay output clutch structure (1051) and the output-end clutch structure (1052) are disengaged and the coil-shaped spring capable of rotating for axial actuation (1043) is returned, thereby terminating the transmission of the rotary kinetic energy;

moreover, when the rotational speed in which the centrifugal force combining type centrifugal clutch (1006) driven at the prime motive end (101) is greater or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the recovering actuation spring (120) to be returned, thereby allowing the relay output clutch structure (1051) and the output-end clutch structure (1052) to be disengaged;

a limit-torque sliding damping device (106): composed by a mechanism device having limit-torque sliding damping effect with a restraining function while relative rotational movements are generated between the relay transmission structure assembly (104) and the static housing (107); and is installed between the centrifugal force combining type centrifugal clutch (1006) and the static housing (107); when the coil-shaped spring capable of rotating for axial actuation (1043) is applied with an angular displacement driving force of tightening by the prime motive end (101), through actions of the limit-torque sliding damping device (106), relative movements are generated in the relay transmission structure assembly (104);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force combining type centrifugal clutch (1006): configured by a centrifugal clutch structure device having the function of cutoff at static and low-speed, and installed between the relay transmission structure assembly (104) and the limit-torque sliding damping device (106), and when the active side of relay coupling structure is rotationally driven by the prime motive end (101) to reach a pre-set rotational speed, the centrifugal clutch (1006) is in an engaged state, so as to combine the relay transmission structure assembly (104) and the limit-torque sliding damping device (106) for generating the limit-torque sliding damping between the relay transmission structure assembly (104) and the static housing (107), thereby a relative movement is generated between the active side of relay coupling structure and the passive side of relay coupling structure combined in the relay transmission structure assembly (104);

a static housing (107): configured by a static housing structure for accommodating the centrifugal force combined with sliding damping type torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and is disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

relay output clutch structure (1051): the relay output clutch structure (1051) is composed by a clutch function structure and is installed in the relay transmission structure assembly (104), when the coil-shaped spring capable of rotating for axial actuation (1043) is driven at the prime motive end (101), the relay output clutch structure (1051) and the relay transmission structure assembly (104) are driven by the coil-shaped spring capable of rotating for axial actuation (1043) having the relay coupling structure function and installed between the relay transmission structure assembly (104) and the prime motive end (101), so as to perform closing/opening operations with the output-end clutch structure (1052) for transmitting rotary kinetic energy and forcing the recovering actuation spring (120) to be tightened; when the rotational driving torque from the prime motive end (101) to the output end (102) is no longer provided, the relay output clutch structure (1051) and the output-end clutch structure (1052) are disengaged and the coil-shaped spring capable of rotating for axial actuation (1043) is returned through the releasing recovering force of the recovering actuation spring (120), thereby terminating the transmission of the rotary kinetic energy;

an out-put end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the centrifugal force combined with sliding damping type torque-actuated clutch of the present invention, the relay coupling structure installed in the relay transmission structure assembly (104) can be further composed by an axial compelling over running clutch;

FIG. 4 is a schematic structural view of one embodiment illustrating that the relay coupling structure installed in the relay transmission structure assembly (104) is composed by the axial compelling over running clutch.

As shown in FIG. 4, it mainly consists of:
a prime motive end (101): composed by a rotational mechanism for outputting rotary kinetic energy; the prime motive end (101) is an active side of axial compelling over running clutch (1061), having the function of active side of relay input coupling structure, for driving the relay transmission structure assembly (104), the prime motive end (101) is installed with a limiting structure (115) for limiting relative positions of the relay transmission structure assembly (104) and the prime motive end (101);
an output end (102): composed by a rotational mechanism for outputting rotary kinetic energy; the output end (102) is connected to an output-end clutch structure (1052), and is controlled by the output-end clutch structure (1052);
a relay transmission structure assembly (104): the relay transmission structure assembly (104) is installed between the prime motive end (101) and the output end (102), the relay transmission structure assembly (104) is installed with an axial compelling over running clutch (1060) having the function of relay coupling structure, the axial compelling over running clutch (1060) has an active side of axial compelling over running clutch (1061) and a passive side of axial compelling over running clutch (1062) and middle rolling members (1063), a plurality of saw-shaped intervals are formed between the active side of axial compelling over running clutch (1061) and the passive side of axial compelling over running clutch (1062) for accommodating the middle rolling members (1063) so as to constitute the over running clutch function; a limit-torque sliding damping device (106) and a centrifugal force combining type centrifugal clutch (1006) are installed between the relay transmission structure assembly (104) and the static housing (107), when the axial compelling over running clutch (1060) is driven by the prime motive end (101) to be in an idle state before reaching a set rotational speed, and at the time reaching or exceeding the set rotational speed a damping effect is generated through the centrifugal force combining type centrifugal clutch (1006) and the limit-torque sliding damping device (106) installed between the relay transmission structure assembly (104) and the static housing (107), so the active side of axial compelling over running clutch (1061) applies the rotational driving torque to the passive side of axial compelling over running clutch (1062) via the middle running members (1063); before the middle rolling members (1063) are forced to be latched between the active side of axial compelling over running clutch (1061) and the passive side of axial compelling over running clutch (1062), the passive side of axial compelling over running clutch (1062) is compelled to be axially moved, so the relay transmission structure assembly (104) installed with the axial compelling over running clutch (1060) generates a relative movement for driving the relay output clutch structure (1051) and the output-end clutch structure (1052) installed in the relay transmission structure assembly (104) to perform opening/closing operations for transmitting the rotary kinetic energy and to force the recovering actuation spring (120) being tightened;

when the rotational driving torque from the prime motive end (101) to the output end (102) is no longer provided, through the releasing recovering force of the recovering actuation spring (120) the relay output clutch structure (1051) and the output-end clutch structure (1052) are disengaged and the passive side of axial compelling over running clutch (1062) is returned, thereby terminating the transmission of the rotary kinetic energy;

moreover, when the rotational speed in which the centrifugal force combining type centrifugal clutch (1006) driven at the prime motive end (101) is greater or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the recovering actuation spring (120) to be returned, thereby allowing the relay output clutch structure (1051) and the output-end clutch structure (1052) to be disengaged;
a limit-torque sliding damping device (106): composed by a mechanism device having limit-torque sliding damping effect with a restraining function while relative rotational movements are generated between the relay transmission structure assembly (104) and the static housing (107); and is installed between the centrifugal force combining type centrifugal clutch (1006) and the static housing (107); when the active side of axial compelling over running clutch (1061) is rotationally driven by the prime motive end (101), through actions of the limit-torque sliding damping device (106), relative movements are generated between the active side of axial compelling over running clutch (1061) and the passive side of axial compelling over running clutch (1062);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;
centrifugal force combining type centrifugal clutch (1006): configured by a centrifugal clutch structure device having the function of cutoff at static and low-speed, and installed between the relay transmission structure assembly (104) and the limit-torque sliding damping device (106), and when the active side of relay coupling structure is rotationally driven by the prime motive end (101) to reach a pre-set rotational speed, the centrifugal clutch (1006) is in an engaged state, so as to combine the relay transmission structure assembly (104) and the limit-torque sliding damping device (106) for generating the limit-torque sliding damping between the relay transmission structure assembly (104) and the static housing (107), thereby a relative movement is generated between the active side of relay coupling structure and the passive side of relay coupling structure combined in the relay transmission structure assembly (104);

a static housing (107): configured by a static housing structure for accommodating the centrifugal force combined with sliding damping type torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and is disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the active side of axial compelling over running clutch (1061) is driven by the prime motive end (101), the passive side of axial compelling over running clutch (1062) installed in the relay transmission structure assembly (104) is axially driven so as to drive the relay transmission structure assembly (104) and the relay output clutch structure (1051) installed in the relay transmission structure assembly (104) for performing opening/closing operations with the output-end clutch structure (1052) for transferring rotary kinetic energy and forcing the recovering actuation spring (120) to be tightened; when the rotational driving torque from the prime motive end (101) to the output end (102) is no longer provided, the relay output clutch structure (1051) and the output-end clutch structure (1052) are disengaged and the passive side of axial compelling over running clutch (1062) is returned through the releasing recovering force of the recovering actuation spring (120), thereby terminating the transmission of the rotary kinetic energy;

an out-put end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the centrifugal force combined with sliding damping type torque-actuated clutch of the present invention, wherein the relay coupling structure installed in the relay transmission structure assembly (104) can be further composed by an axial relay clutch of the axial clutch transmission block having axial compelling pre-forced recovering.

Figure 5:
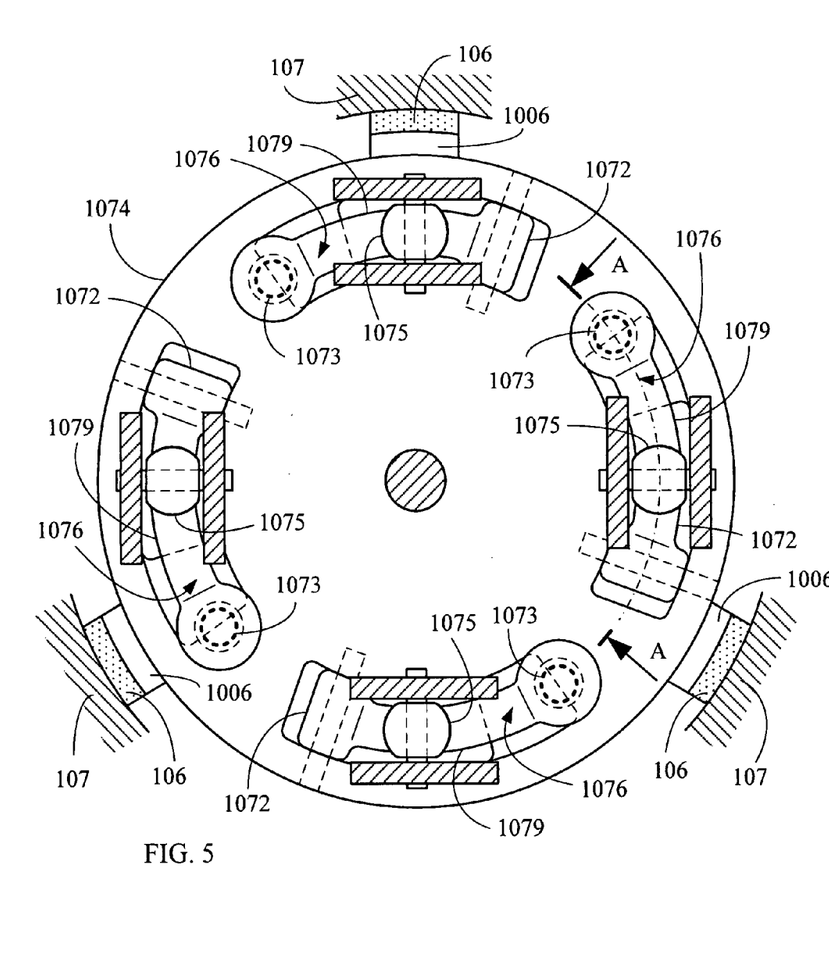
FIG. 5 is a schematic structural view of one embodiment illustrating that the relay coupling structure installed in the relay transmission structure assembly (104) is composed by the axial relay clutch of the axial clutch transmission block having axial compelling pre-forced recovering.

FIG. 5 is a structural schematic view of one embodiment illustrating that the relay coupling structure installed in the relay transmission structure assembly (104) is composed by the axial relay clutch of the axial clutch transmission block having axial compelling pre-forced recovering.

Figure 6:
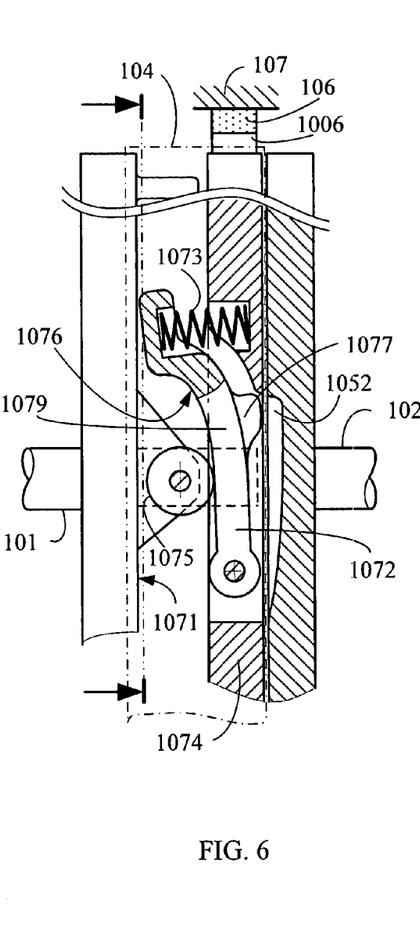
FIG. 6 is a cross sectional view of FIG. 5 intersected along an A-A line.

As shown in FIG. 5, it mainly consists of:

a prime motive end (101): composed by a rotational mechanism for inputting rotary kinetic energy; the prime motive end (101) is an axial relay clutch having the function of relay coupling structure, for driving the relay transmission structure assembly (104);

an output end (102): composed by a rotational mechanism for outputting rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), the relay transmission structure assembly (104) has an axial relay clutch which mainly consists of an active side of axial relay clutch (1071), an axial clutch transmission block (1072), an axial clutch transmission block recovering spring (1073), an axial relay clutch transmission board (1074), and a middle rolling member (1075); wherein the active side of axial relay clutch (1071) accommodating the middle rolling member (1075) is driven by the prime motive end (101), the middle rolling member (1075) is coupled to a passive side of axial relay clutch (1076) which is an obliquely compelled surface with respect to the axial clutch transmission block (1072), the axial clutch transmission block (1072) is installed on the axial relay clutch transmission board (1074), a limit-torque sliding damping device (106) and a centrifugal force combining type centrifugal clutch (1006) are installed between the axial relay clutch transmission board (1074) and the static housing (107), one end of the axial clutch transmission block (1072) is fastened on the axial relay clutch transmission board (1074), the other end of the axial clutch transmission block (1072) is served as a transmission end (1079), the passive side of axial relay clutch (1076) of the transmission end (1079) is an obliquely compelled surface allowing the middle rolling member (1075) to be coupled, the other surface of the transmission end (1079) is served as an axial clutch structure (1077), when the active side of axial relay clutch (1071) equipped with the middle rolling member (1075) by the prime motive end (101) to be in an idle state before reaching a set rotational speed, and at the time reaching or exceeding the set rotational speed the centrifugal force combining type centrifugal clutch (1006) installed between the relay transmission structure assembly (104) and the static housing (107) is in an engaged state so as to be combined with the limit-torque sliding damping device (106) for generating a damping effect, thereby the passive side of axial relay clutch (1076) which is an obliquely compelled surface with respect to the axial clutch transmission block (1072) is compelled to move by the middle rolling member (1075) installed at the active side of axial relay clutch (1071), and the axial clutch structure (1077) is further moved to be coupled with the output-end clutch structure (1052) of the output end (102) for transferring rotary kinetic energy, when the rotational driving torque from the prime motive end (101) to the output end (102) is no longer provided, through the elasticity of the axial clutch transmission block (1072) and/or the releasing recovering force of the axial clutch transmission block recovering spring (1073) installed between the axial relay clutch transmission board (1074) and the middle rolling member (1075), such that the axial clutch structure (1077) of the axial clutch transmission block (1072) and the output-end clutch structure (1052) of the output end (102) are disengaged, and the axial relay clutch transmission board (1074) is returned, thereby terminating the transmission of the rotary kinetic energy;

moreover, when the rotational speed in which the centrifugal force combining type centrifugal clutch (1006) driven at the prime motive end (101) is smaller or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the axial clutch transmission block recovering spring (1073) to be returned, thereby allowing the axial clutch structure (1077) and the output-end clutch structure (1052) to be disengaged;

a limit-torque sliding damping device (106): composed by a mechanism device having limit-torque sliding damping effect with a restraining function while relative rotational movements are generated between the axial relay clutch transmission board (1074) and the static housing (107), and is installed between the static housing (107) and the axial relay clutch transmission board (1074), when the active side of axial relay clutch (1071) is rotationally driven by the prime motive end (101), through actions of the limit-torque sliding damping device (106), during the active side of axial relay clutch (1071) performing rotational driving to the axial relay clutch transmission board (1074), the axial clutch transmission block (1072) and the axial clutch structure (1077) of the axial relay clutch transmission board (1074) is compelled to move by the middle rolling member (1075) driven by the active side of axial relay clutch (1071) to generate relative movements;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force combining type centrifugal clutch (1006): configured by a centrifugal clutch structure device having the function of cutoff at static and low-speed, and installed between the axial relay clutch transmission board (1074) and the limit-torque sliding damping device (106), and when the active side of relay coupling structure is driven by the prime motive end (101) to perform rotationally driving to reach a set rotational speed, the centrifugal clutch (1006) is in an engaged state, so as to combine the axial relay clutch transmission board (1074) and the limit-torque sliding damping device (106) for generating limit-torque sliding damping between the axial relay clutch transmission board (1074) and the static housing (107), thereby a relative movement is generated between the active side of relay coupling structure and the passive side of relay coupling structure combined in the relay transmission structure assembly (104);

a static housing (107): configured by a static housing structure for accommodating the centrifugal force combined with sliding damping type torque-actuated clutch;

an output-end clutch structure (1052): the output-end clutch structure (1052) is composed by a clutch function structure and is connected to the output end (102) to be served to perform opening/closing operations with the axial clutch structure (1077) of the transmission end (1079) of the axial clutch transmission block (1072) of the axial relay clutch transmission board (1074) for transferring rotary kinetic energy, or in a disengaged state for terminating the transmission of the rotary kinetic energy;

the clutch structure of the relay output clutch structure (1051) and the output-end clutch structure (1052) consists of the friction-type clutch structure, the engaging-type clutch structure or the synchro-engaging clutch structure;

a middle rolling member (1075): which can be replaced by rolling balls, cone-shaped cylinders, or spherical or arc-shaped protrusions;

In the centrifugal force combined with sliding damping type torque-actuated clutch of the present invention, the relay output coupling structure installed in the relay transmission structure assembly (104) can be further composed by the radial relay clutch of the radial clutch transmission block having radial compelling pre-forced recovering;

FIG. 6 is a cross sectional view of FIG. 5 intersected along an A-A line.

Figure 7:
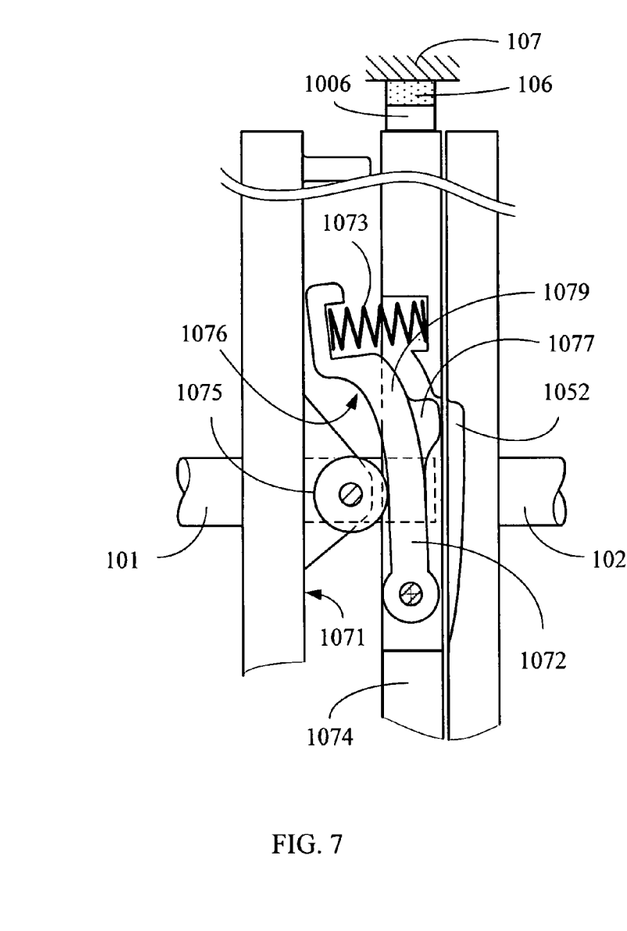
FIG. 7 is a schematic view illustrating the disengaged state of the axial clutch structure (1077) and the output-end clutch structure (1052) as shown in FIG. 5.

FIG. 7 is a schematic view illustrating the disengaged state of the axial clutch structure (1077) and the output-end clutch structure (1052) as shown in FIG. 5.

Figure 8:
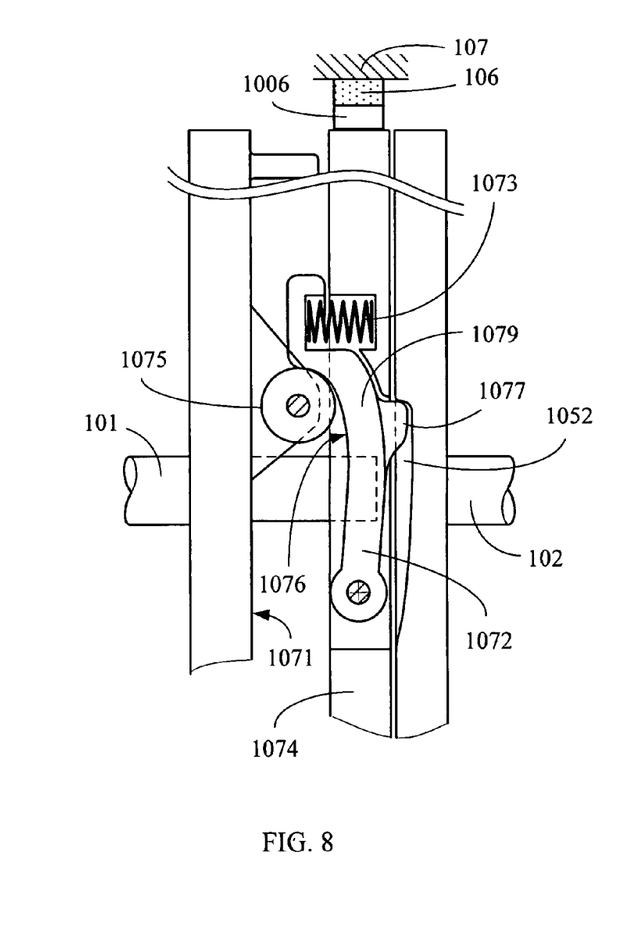
FIG. 8 is a schematic view illustrating the engaged state of the axial clutch structure (1077) and the output-end clutch structure (1052) as shown in FIG. 5.

FIG. 8 is a schematic view illustrating the engaged state of the axial clutch structure (1077) and the output-end clutch structure (1052) as shown in FIG. 5.

Figure 9:
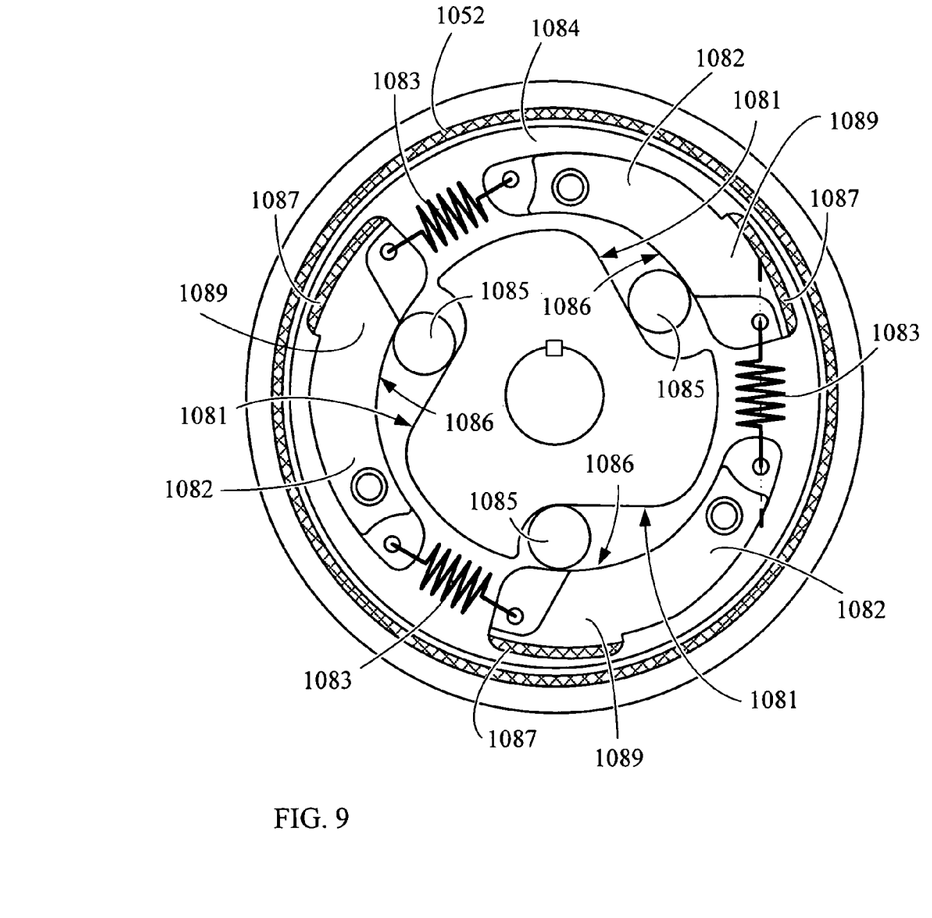
FIG. 9 is a schematic structural view of one embodiment illustrating that the relay coupling structure and the relay outputting structure installed in the relay transmission structure assembly (104) is composed by the radial relay clutch of the radial clutch transmission block having radial compelling pre-forced recovering.

FIG. 9 is a schematic structural view of one embodiment illustrating that the relay coupling structure and the relay outputting structure installed in the relay transmission structure assembly (104) is composed by the radial relay clutch of the radial clutch transmission block having radial compelling pre-forced recovering.

Figure 10:
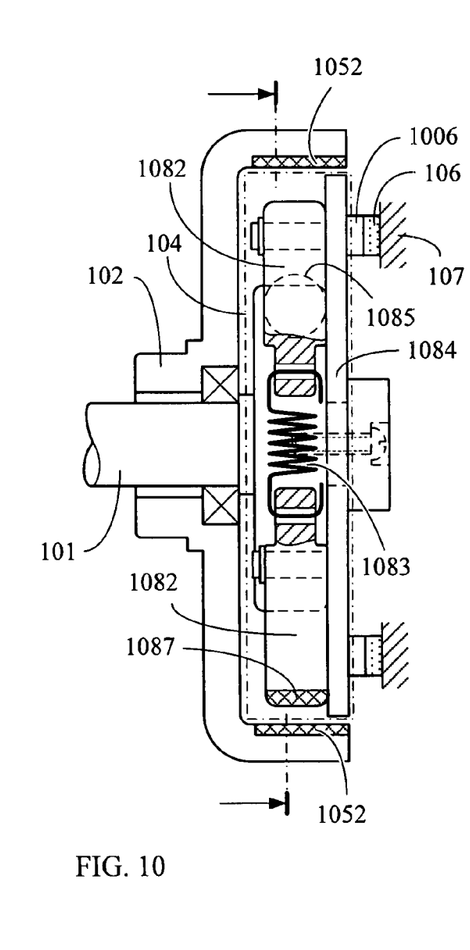
FIG. 10 is a cross sectional view of FIG. 9.

As shown in FIG. 9, it mainly consists of:

a prime motive end (101): composed by a rotational mechanism for inputting the rotary kinetic energy; the prime motive end (101) is a radial relay clutch constituting the function of relay coupling structure, for driving the relay transmission structure assembly (104);

an output end (102): composed by a rotational mechanism for outputting the rotary kinetic energy; the annular interior of the output end (102) is installed with an output-end clutch structure (1052), and is controlled by the output-end clutch structure (1052);

a relay transmission structure assembly (104): the relay transmission structure assembly (104) is installed between the prime motive end (101) and the output end (102), the three components are arranged as a concentric annular structure, the relay transmission structure assembly (104) has a radial relay clutch which mainly consists of an active side of radial relay clutch (1081), a radial clutch transmission block (1082), a radial clutch transmission block recovering spring (1083), a radial relay clutch transmission board (1084), and a middle rolling member (1085); wherein the active side of radial relay clutch (1081) accommodating the middle rolling member (1085) is driven by the prime motive end (101), the middle rolling member (1085) is coupled to a passive side of radial relay clutch (1086) which is an obliquely compelled surface with respect to the radial clutch transmission block (1082), the radial clutch transmission block (1082) is installed on the radial relay clutch transmission board (1084), a limit-torque sliding damping device (106) and a centrifugal force combining type centrifugal clutch (1006) are installed between the radial relay clutch transmission board (1084) and the static housing (107), one end of the radial clutch transmission block (1082) is fastened on the radial relay clutch transmission board (1084), the other end of the radial clutch transmission block (1082) is served as a transmission end (1089), the passive side of radial relay clutch (1086) of the transmission end (1089) is an obliquely compelled surface allowing the middle rolling member (1085) to be coupled, the other surface of the transmission end (1089) is served as a radial clutch structure (1087), when the active side of radial relay clutch (1081) equipped with the middle rolling member (1085) is driven by the prime motive end (101) to be in an idle state before reaching a set rotational speed, and at the time reaching or exceeding the set rotational speed the centrifugal force combining type centrifugal clutch (1006) installed between the relay transmission structure assembly (104) and the static housing (107) is in an engaged state so as to be combined with the limit-torque sliding damping device (106) for generating a damping effect, thereby the passive side of radial relay clutch (1086) which is an obliquely compelled surface with respect to the radial clutch transmission block (1082) is compelled to move by the middle rolling member (1085) installed at the active side of radial relay clutch (1081), and the radial clutch structure (1087) is further moved to be coupled with the output-end clutch structure (1052) of the output end (102) for transferring rotary kinetic energy;

when the rotational driving torque from the prime motive end (101) to the output end (102) is no longer provided, through the elasticity of the radial clutch transmission block (1082) and/or the releasing recovering force of the radial clutch transmission block recovering spring (1083) installed between the radial relay clutch transmission board (1084) and the middle rolling member (1085), such that the radial clutch structure (1087) of the radial clutch transmission block (1082) and the output-end clutch structure (1052) of the output end (102) are disengaged, and the radial relay clutch transmission board (1084) is returned, thereby terminating the transmission of the rotary kinetic energy;

moreover, when the rotational speed in which the centrifugal force combining type centrifugal clutch (1006) driven at the prime motive end (101) is smaller or equal to its disengaging rotational speed, the centrifugal force combining type centrifugal clutch (1006) is in a disengaged state, such that the damping between the relay transmission structure assembly (104) and the static housing (107) is not provided, and the passive side of relay coupling structure of the relay transmission structure assembly (104) is moved by the radial clutch transmission block recovering spring (1083) to be returned, thereby allowing the radial clutch structure (1087) and the output-end clutch structure (1052) to be disengaged;

a limit-torque sliding damping device (106): composed by a mechanism device having limit-torque sliding damping effect with a restraining function while relative rotational movements are generated between the radial relay clutch transmission board (1084) and the static housing (107), and is installed between the static housing (107) and the radial relay clutch transmission board (1084), when the active side of radial relay clutch (1081) is rotationally driven by the prime motive end (101), through actions of the limit-torque sliding damping device (106), during the active side of radial relay clutch (1081) performing rotational driving to the radial relay clutch transmission board (1084), the radial clutch transmission block (1082) and the radial clutch structure (1087) of the radial relay clutch transmission board (1084) is compelled to move by the middle rolling member (1085) driven by the active side of radial relay clutch (1081) to generate relative movements;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force combining type centrifugal clutch (1006): configured by a centrifugal clutch structure device having the function of cutoff at static and low-speed, and installed between the radial relay clutch transmission board (1084) and the limit-torque sliding damping device (106), and when the active side of relay coupling structure is driven by the prime motive end (101) to perform rotationally driving to reach a set rotational speed, the centrifugal clutch (1006) is in an engaged state, so as to combine the radial relay clutch transmission board (1084) and the limit-torque sliding damping device (106) for generating limit-torque sliding damping between the radial relay clutch transmission board (1084) and the static housing (107), thereby a relative movement is generated between the active side of relay coupling structure and the passive side of relay coupling structure combined in the relay transmission structure assembly (104);

a static housing (107): configured by a static housing structure for accommodating the centrifugal force combined with sliding damping type torque-actuated clutch;

an output-end clutch structure (1052): the output-end clutch structure (1052) is composed by a clutch function structure and is connected to the output end (102) to be served to perform opening/closing operations with the radial clutch structure (1087) of the transmission end (1089) of the radial clutch transmission block (1082) of the radial relay clutch transmission board (1084) for transferring rotary kinetic energy, or in a disengaged state for terminating the transmission of the rotary kinetic energy;

the clutch structure of the relay output clutch structure (1051) and the output-end clutch structure (1052) consists of the friction-type clutch structure, the engaging-type clutch structure or the synchro-engaging clutch structure;

a middle rolling member (1085): which can be replaced by rolling balls, cone-shaped cylinders, or spherical or arc-shaped protrusions;

FIG. 10 is a cross sectional view of FIG. 9.

For the centrifugal force combined with sliding damping type torque-actuated clutch of the present invention, it can be composed by two sets of centrifugal force combined with sliding damping type torque-actuated clutches and having the same prime motive end (101), including:

1. two sets of centrifugal force combined with sliding damping type clutches actuated by torque both transmitting in the axial direction, having different operation directions and having the same prime motive end (101);
2. two sets of centrifugal force combined with sliding damping type clutches actuated by torque both transmitting in the axial direction, having the same operation direction and having the same prime motive end (101);
3. two sets of centrifugal force combined with sliding damping type clutches actuated by torque both transmitting in the radial direction, having different operation directions and having the same prime motive end (101);
4. two sets of centrifugal force combined with sliding damping type clutches actuated by torque both transmitting in the radial direction, having the same operation direction and having the same prime motive end (101);
5. two sets of centrifugal force combined with sliding damping type clutches actuated by torque in which one set transmitting in the radial direction and the other transmitting in the axial direction, having different operation directions and having the same prime motive end (101);
6. two sets of centrifugal force combined with sliding damping type clutches actuated by torque in which one set transmitting in the radial direction and the other transmitting in the axial direction, having the same operation direction and having the same prime motive end (101).

The invention claimed is:

1. A clutch device that utilizes centrifugal force and sliding damping, comprising:
   a relay transmission structure assembly (104) including a relay output coupling structure (204) having an active side connected to a prime motive end (101) and a passive side that includes a relay output-end clutch structure (1051 or 1087), wherein the relay output-end clutch structure (1051) engages an output end clutch structure (1052) connected to a clutch output end (102) when the active side of the relay output coupling structure (204) is driven by the prime motive end (101);
   a static housing (107); and
   a limited torque sliding damping device (106) installed on the static housing; and
   a centrifugal clutch (1006) installed on the relay transmission structure assembly (104) at a position facing the limited torque sliding damping device (106), wherein:
   when the prime motive end (101) is driven in a first rotating direction before the relay output coupling structure (204) reaches a pre-set rotational speed, the relay output coupling structure (204) is in an idle state and the relay clutch structure (1051 or 1087) is disengaged from the output-end clutch structure (1052) so that the clutch output end (102) is disengaged from the prime motive end (101), and
   when the prime motive end (101) drives the relay output coupling structure (204) to reach or exceed the pre-set rotational speed, the centrifugal clutch (1006) installed on the relay transmission structure assembly (104) engages with the sliding damping device (106), the engagement resulting in generation of a limited reverse torque that acts on the relay transmission structure assembly (104) on the passive side of the relay output coupling structure (204) to cause a relative movement between the active and passive sides of the relay output coupling structure (204), thereby moving the relay clutch structure (1051, 1077 or 1087) in a closing direction against a return spring force of at least one recovering actuation spring (120, 1073, or 1083) and causing the relay clutch structure (1051, 1077, or 1087) to engage the output-end clutch structure (1052) and transmit rotational kinetic energy from the prime motive end through the relay transmission structure assembly (104) to the output end (102), and
   when the prime motive end (101) is no longer driven in the first rotational direction and the rotational speed of the relay output coupling structure falls to below or equal to the preset rotational speed, the centrifugal clutch (1006) releases the sliding damping device (106) so that the reverse torque is no longer generated and the return spring force of the at least one recovering actuation spring (120, 1073, or 1083) causes the relay clutch structure (1051, 1077, or 1087) to move in an opening direction and disengage from the output-end clutch structure (1052).

2. A clutch device as recited in claim 1, wherein the sliding damping device (106) and centrifugal clutch (1006) interact by one of a mechanical force, spring pre-stressing force, electromagnetic force, and magnetic force acting between solid materials, a solid and a viscous fluid, viscous fluids, or between a solid and a gas or liquid, to generate the limited reverse torque that causes the relative movement between the active and passive sides of the relay output coupling structure.

3. A clutch device as recited in claim 1, wherein the relay clutch structure (1051, 1077, or 1087) and output-end clutch structure (1052) comprises one of a friction-type clutch structure, engaging-type clutch structure, and synchro-engaging clutch structure.

4. A clutch device as recited in claim 1, wherein said recovering actuation spring (120) is a first coil spring that extends between the relay output coupling structure (204) and the output end (102), and said relay output coupling structure (204) includes a screw rod structure (1041) on the active side and a screw nut structure (1042) on the passive side.

5. A clutch device as recited in claim 4, wherein said relay output coupling structure (204) further includes a second coil spring (1043) that axially drives the passive side of the relay output coupling structure (204) when the active side of the relay output coupling structure is driven by the prime motive end (101).

6. A clutch device as recited in claim 1, further comprising a limiting structure (115) for limiting movement of the active side of the relay output coupling structure assembly (204) away from the output end (102).

7. A clutch device as recited in claim 1, wherein the relay transmission structure assembly (104) is an axial compelling over-running clutch (1060) that includes the active side (1061) of the relay coupling structure (204), the passive side (1062) of the relay coupling structure (204), and middle rolling members (1063), wherein a plurality of saw-shaped intervals are formed between the active side (1061) and the passive side (1062) for accommodating the middle rolling members (1063) so as to provide an over-running clutch function.

8. A clutch device as recited in claim 1, wherein the relay coupling structure (204) is an axial relay clutch assembly for actuating an axial relay clutch (1076) and said at least one recovering actuation spring is an axial clutch transmission block recovering spring (1073), said relay clutch assembly including an axial relay clutch transmission board (1074), and a middle rolling member (1075), wherein the axial clutch transmission block recovering spring (1073 extends between the axial relay clutch (1076) and the axial relay clutch transmission board (1074), the active side (1071) of the axial relay clutch assembly accommodates the middle rolling member (1075), the middle rolling member (1075) being coupled to a passive side of the axial relay clutch (1076) and arranged to engage an oblique surface of an axial clutch transmission block (1072) to cause the axial relay clutch to pivot and compress the axial clutch transmission block recovering spring (1073) when the middle rolling member (1075) is driven by the prime motive end (101), pivoting of the axial relay clutch (1076) causing the relay output clutch structure (1077) on the axial clutch transmission block (1072) to engage the output-end clutch structure (1052).

9. A clutch device as recited in claim 1, wherein:
the relay transmission structure assembly (104), the prime motive end (101), and output end (102) are arranged as a concentric annular structure with the relay transmission structure assembly (104) being installed between the prime motive end (101) and the output end (102),
the relay coupling structure (204) is a radial relay clutch assembly for actuating at least one radial relay clutch (1086),
the relay clutch (1086) includes at least one radial clutch transmission block (1082), wherein the at least one actuation recovering spring includes at least one radial clutch transmission block recovering spring (1083) extending from a first end of the at least one radial clutch transmission block (1082), the relay clutch assembly including at least one radial relay clutch transmission board (1084), and at least one middle rolling member (1085),
an active side (1081) of the relay coupling structure (204) accommodates the middle rolling member (1085) and is shaped to cause radial movement of the middle rolling member (1085) when the active side (1081) of the relay coupling structure (204) is rotated by the prime motive end (101, and
the middle rolling member (1085) is coupled to a passive side of the at least one radial relay clutch (1086) and arranged to engage an oblique surface of the radial clutch transmission block (1082) to cause the at least one radial clutch transmission block (1082) to pivot against the at least one radial clutch transmission block recovering spring (1083) when the middle rolling member (1085) is driven by the prime motive end (101),
whereby pivoting of the at least one radial clutch transmission block (1082) causing the relay output clutch structure (1051) on a second end (1089) of the radial clutch transmission block (1082) to engage the output-end clutch structure (1052).

10. A clutch device as claimed in claim 9, wherein a number of the radial clutch transmission blocks (1082) is at least two and the at least one radial clutch transmission block recovering spring (1083) extends between the first end of a first of the radial clutch transmission blocks (1082) and the second end of a second of the radial clutch transmission blocks (1082) such that pivoting of the first and second radial clutch transmission blocks (1082) stretches the at least one radial clutch transmission block recovering spring (1083) to generate said return spring force.

11. A clutch device as recited in claim 1, wherein said centrifugal clutch (1006) is a radial clutch structure.

12. A clutch device as recited in claim 11, comprising at least two said radial clutch structures operating in different directions.

13. A clutch as recited in claim 1, wherein said centrifugal clutch (1006) is an axial clutch structure.

14. A clutch device as recited in claim 13, comprising two said axial clutch structures operating in a same direction.

\* \* \* \* \*